United States Patent
Yin et al.

(10) Patent No.: US 10,974,349 B2
(45) Date of Patent: Apr. 13, 2021

(54) METHOD FOR GAS METAL ARC WELDING (GMAW) OF NITRIDED STEEL COMPONENTS USING CORED WELDING WIRE

(71) Applicant: Magna Powertrain, Inc., Concord (CA)

(72) Inventors: Guobin Yin, Richmond Hill (CA); Troy K. Hogan, Alliston (CA)

(73) Assignee: MAGNA POWERTRAIN, INC., Concord, CA (US)

( * ) Notice: Subject to any disclaimer, the term of this patent is extended or adjusted under 35 U.S.C. 154(b) by 992 days.

(21) Appl. No.: 14/961,226

(22) Filed: Dec. 7, 2015

(65) Prior Publication Data

US 2016/0101485 A1    Apr. 14, 2016

Related U.S. Application Data

(63) Continuation-in-part of application No. 13/993,244, filed as application No. PCT/CA2011/001390 on Dec. 19, 2011, now Pat. No. 9,205,512.

(Continued)

(51) Int. Cl.
*B23K 26/211* (2014.01)
*B23K 26/20* (2014.01)
(Continued)

(52) U.S. Cl.
CPC .......... *B23K 35/3093* (2013.01); *B23K 26/28* (2013.01); *B23K 26/32* (2013.01);
(Continued)

(58) Field of Classification Search
CPC ............ B23K 35/3053; B23K 35/0255; B23K 35/0261; B23K 35/3093; B23K 26/28;
(Continued)

(56) References Cited

U.S. PATENT DOCUMENTS 2,909,778 A * 10/1959 Landis ............... B23K 35/3053
219/146.3
3,114,033 A * 12/1963 Elster ................... B23K 35/306
219/146.41

(Continued)

FOREIGN PATENT DOCUMENTS

AU 751841 B2 8/2002

OTHER PUBLICATIONS

International Search Report and Written Opinion dated Mar. 13, 2017 in corresponding PCT International Patent Application No. PCT/CA2016/000303.

(Continued)

*Primary Examiner* — Eric S Stapleton
(74) *Attorney, Agent, or Firm* — Dickinson Wright PLLC

(57) ABSTRACT

A method for gas metal arc welding a first component formed of nitrided steel to a second component with reduced porosity in the weld is provided. A welding wire including a core surrounded by a tube is used to weld the components. The material of the core is formed of mild steel including 0.7 to 3.0 wt. % aluminum and 0.7 to 1.5 wt. % titanium. The material of the tube is formed entirely of low carbon steel. During the weld process, the nitrogen from the nitrided steel combines with the aluminum and titanium of the welding wire to form aluminum nitride and titanium nitride, instead of nitrogen bubbles which lead to high porosity. The method can be used to weld components used in automotive applications, for example to weld a ring gear and can of a flexplate, but alternatively could be used for another automotive or non-automotive applications.

3 Claims, 5 Drawing Sheets

Related U.S. Application Data

(60) Provisional application No. 61/424,327, filed on Dec. 17, 2010, provisional application No. 62/115,859, filed on Feb. 13, 2015.

(51) Int. Cl.
  *B23K 35/30*    (2006.01)
  *B23K 35/02*    (2006.01)
  *B23K 26/32*    (2014.01)
  *B23K 26/28*    (2014.01)
  *B23K 103/04*   (2006.01)
  *B23K 101/00*   (2006.01)

(52) U.S. Cl.
  CPC ...... *B23K 35/0255* (2013.01); *B23K 35/0261* (2013.01); *B23K 35/30* (2013.01); *B23K 35/3053* (2013.01); *B23K 2101/008* (2018.08); *B23K 2103/04* (2018.08)

(58) Field of Classification Search
  CPC .. B23K 26/32; B23K 35/30; B23K 2201/008; B23K 2203/04; B23K 2103/04; B23K 2101/008
  USPC .............................................. 219/121.64, 72
  See application file for complete search history.

(56) References Cited

U.S. PATENT DOCUMENTS

| | | | | |
|---|---|---|---|---|
| 3,235,405 A * | 2/1966 | Quaas | B23K 35/3033 | 428/561 |
| 3,249,736 A * | 5/1966 | Kobayashi | B23K 35/3053 | 219/137 R |
| 3,253,950 A * | 5/1966 | Wasserman | B23K 35/365 | 428/562 |
| 3,258,842 A * | 7/1966 | Nishi | B23K 35/38 | 219/137 R |
| 3,259,970 A * | 7/1966 | Fujimori | B23K 35/38 | 228/224 |
| 3,328,557 A * | 6/1967 | Rogers | B23K 35/3033 | 219/146.52 |
| 3,466,422 A * | 9/1969 | Witherell | B23K 35/3066 | 219/146.32 |
| 3,493,712 A * | 2/1970 | Nakamura | B23K 9/186 | 219/73 |
| 3,644,697 A * | 2/1972 | Krahl | B23K 35/383 | 219/74 |
| 3,742,185 A * | 6/1973 | Parks | B23K 35/3602 | 219/146.22 |
| 3,778,588 A * | 12/1973 | Bishel | B23K 35/3033 | 219/146.52 |
| 3,863,433 A * | 2/1975 | Kanai | D01H 1/425 | 57/357 |
| 3,980,859 A * | 9/1976 | Leonard | B23K 11/04 | 219/104 |
| 3,995,139 A * | 11/1976 | Bouvard | B23K 35/3093 | 219/146.51 |
| 4,035,892 A * | 7/1977 | Ototani | B23K 35/0266 | 428/576 |
| 4,087,673 A * | 5/1978 | Kiilunen | B23K 35/3033 | 148/26 |
| 4,089,771 A * | 5/1978 | Westerlund | C25B 11/02 | 204/284 |
| 4,097,268 A * | 6/1978 | Ototani | B23K 35/0266 | 428/639 |
| 4,149,063 A * | 4/1979 | Bishel | B23K 35/304 | 219/137 WM |
| 4,224,085 A * | 9/1980 | Brendel | B21C 37/042 | 148/513 |
| 4,352,970 A * | 10/1982 | Mathy | B23K 35/3053 | 219/72 |
| 4,462,269 A * | 7/1984 | Inglis | F16F 15/1315 | 123/185.1 |
| 4,593,174 A * | 6/1986 | Saito | B23K 35/3066 | 219/137 WM |
| 4,670,065 A * | 6/1987 | Yasuda | C22C 38/60 | 148/320 |
| 4,671,820 A * | 6/1987 | Ototani | B23K 35/0266 | 420/30 |
| 4,698,095 A * | 10/1987 | Ototani | B23K 35/0266 | 428/649 |
| 4,717,536 A * | 1/1988 | Chai | B23K 35/3053 | 148/24 |
| 4,738,389 A * | 4/1988 | Moshier | B22F 3/23 | 228/148 |
| 4,800,131 A * | 1/1989 | Marshall | B23K 35/0272 | 419/3 |
| 4,837,089 A * | 6/1989 | Araki | B22F 7/06 | 419/11 |
| 4,943,698 A * | 7/1990 | Mengel | B23K 35/22 | 219/121.47 |
| 4,947,463 A * | 8/1990 | Matsuda | B05B 7/228 | 219/121.66 |
| 4,960,643 A * | 10/1990 | Lemelson | B23D 61/185 | 384/907.1 |
| 4,994,640 A * | 2/1991 | Kiser | B23K 35/3066 | 219/145.22 |
| 5,171,968 A * | 12/1992 | Bates | B23K 35/304 | 219/146.22 |
| 5,262,123 A * | 11/1993 | Thomas | B21C 23/22 | 419/41 |
| 5,339,892 A * | 8/1994 | Clifton | A23L 3/364 | 165/168 |
| 5,370,008 A * | 12/1994 | Landolt | F02N 15/027 | 192/104 C |
| 5,422,071 A * | 6/1995 | Kiser | B23K 35/3033 | 420/73 |
| 5,429,883 A * | 7/1995 | Sasaki | B23K 35/0255 | 428/678 |
| 5,446,257 A * | 8/1995 | Sakamoto | B23K 26/04 | 219/121.63 |
| 5,618,452 A * | 4/1997 | Matubara | B23K 26/123 | 219/121.63 |
| 5,678,753 A * | 10/1997 | Stauder | B23K 9/23 | 219/137 R |
| 5,772,795 A * | 6/1998 | Lally | C21D 8/0457 | 148/221 |
| 5,808,270 A * | 9/1998 | Marantz | B05B 7/224 | 219/121.47 |
| 5,831,239 A | 11/1998 | Matubara et al. | | |
| 5,835,842 A * | 11/1998 | Sasaki | B23K 35/0255 | 428/552 |
| 5,855,846 A * | 1/1999 | Beguinot | C22C 38/54 | 420/121 |
| 5,966,909 A * | 10/1999 | Kammler | B29C 65/18 | 53/552 |
| 6,167,677 B1 * | 1/2001 | Kammler | B29C 66/1122 | 53/374.8 |
| 6,224,689 B1 * | 5/2001 | Koo | C22C 38/04 | 148/320 |
| 6,228,183 B1 * | 5/2001 | Bangaru | C22C 38/04 | 148/320 |
| 6,248,191 B1 * | 6/2001 | Luton | C21D 1/19 | 148/653 |
| 6,264,760 B1 * | 7/2001 | Tamehiro | C21D 1/19 | 148/330 |
| 6,308,882 B1 * | 10/2001 | Shuster | B23K 35/3033 | 228/175 |
| 6,339,209 B1 * | 1/2002 | Kotecki | B23K 35/3601 | 148/24 |
| 6,596,962 B2 * | 7/2003 | Haschke | B23K 26/02 | 219/121.61 |
| 6,608,284 B1 * | 8/2003 | Nikodym | B23K 35/3053 | 219/137 WM |
| 6,683,268 B2 * | 1/2004 | Briand | B23K 9/0253 | 219/61 |
| 6,706,416 B1 * | 3/2004 | Cacace | B22F 3/1216 | 148/514 |

(56) References Cited

U.S. PATENT DOCUMENTS

| | | | | |
|---|---|---|---|---|
| 6,727,459 B1* | 4/2004 | Bialach | B23K 10/027 | 219/121.64 |
| 6,730,876 B2* | 5/2004 | Copeland | B23K 9/23 | 219/137 WM |
| 6,744,007 B2* | 6/2004 | Ono | B23K 26/24 | 219/121.64 |
| 6,770,840 B2* | 8/2004 | Minamida | B23K 26/1435 | 219/121.64 |
| 7,087,859 B2* | 8/2006 | Burt | B23K 35/0216 | 219/145.1 |
| 7,241,971 B2* | 7/2007 | Bonnet | B23K 35/3053 | 219/137 WM |
| 7,288,737 B2* | 10/2007 | Briand | B23K 26/348 | 219/121.64 |
| 7,408,130 B2* | 8/2008 | Sonoda | B23K 9/0675 | 219/121.63 |
| 7,518,082 B2* | 4/2009 | Helgee | B23K 9/173 | 219/74 |
| 7,601,231 B2* | 10/2009 | Hara | C21D 8/0226 | 148/330 |
| 7,812,284 B2* | 10/2010 | Narayanan | B23K 35/3602 | 219/146.1 |
| 7,842,903 B2* | 11/2010 | Myers | B23K 9/1062 | 219/130.21 |
| 8,269,144 B2* | 9/2012 | Kapoor | B23K 9/02 | 219/146.1 |
| 8,704,135 B2* | 4/2014 | Narayanan | B23K 9/093 | 219/130.1 |
| 8,758,901 B2* | 6/2014 | Nakamura | B23K 35/0255 | 428/655 |
| 8,759,715 B2* | 6/2014 | Narayanan | B23K 9/092 | 219/130.51 |
| 9,095,919 B2* | 8/2015 | Burt | B23K 9/02 | |
| 9,138,831 B2* | 9/2015 | Keegan | B23K 35/0261 | |
| 9,205,512 B2* | 12/2015 | Gu | B23K 26/28 | |
| 2001/0030004 A1* | 10/2001 | Kushida | B23K 9/0253 | 148/325 |
| 2002/0096500 A1* | 7/2002 | Ono | B23K 26/24 | 219/121.64 |
| 2003/0038120 A1* | 2/2003 | Minamida | B23K 26/1435 | 219/121.64 |
| 2004/0031544 A1* | 2/2004 | Hara | C21D 8/0226 | 148/521 |
| 2004/0169026 A1* | 9/2004 | Chen | B23K 35/0266 | 219/146.1 |
| 2005/0100331 A1* | 5/2005 | Konishi | F26B 3/30 | 392/407 |
| 2005/0135958 A1* | 6/2005 | Thorne | B22F 3/1291 | 419/8 |
| 2005/0155960 A1* | 7/2005 | Bonnet | B23K 35/3053 | 219/137 WM |
| 2005/0205525 A1* | 9/2005 | Barhorst | B23K 9/173 | 219/74 |
| 2005/0211687 A1* | 9/2005 | Sonoda | B23K 9/0675 | 219/137 R |
| 2005/0274773 A1* | 12/2005 | Poulalion | C21C 7/0056 | 228/101 |
| 2006/0054603 A1* | 3/2006 | Briand | B23K 26/348 | 219/121.64 |
| 2006/0076336 A1* | 4/2006 | Nagarajan | B23K 9/173 | 219/145.1 |
| 2007/0137421 A1* | 6/2007 | Reid | F16D 3/79 | 74/572.2 |
| 2007/0181549 A1* | 8/2007 | Hartman | B23K 35/0261 | 219/137 WM |
| 2007/0208395 A1* | 9/2007 | Leclerc | A61N 5/0616 | 607/86 |
| 2007/0259754 A1* | 11/2007 | Shamie | F16H 3/663 | 475/331 |
| 2008/0127492 A1* | 6/2008 | Smith | B23K 37/0426 | 29/888.011 |
| 2008/0272100 A1* | 11/2008 | Amata | B23K 35/0261 | 219/137 R |
| 2009/0025835 A1* | 1/2009 | Hara | C22C 38/02 | 148/521 |
| 2009/0065098 A1* | 3/2009 | Soshiroda | C21D 1/06 | 148/230 |
| 2009/0220815 A1* | 9/2009 | Canourgues | B23K 9/23 | 428/583 |
| 2009/0253099 A1* | 10/2009 | Debry | A61C 8/0012 | 433/174 |
| 2009/0269605 A1* | 10/2009 | Warke | B21C 23/22 | 428/550 |
| 2009/0314759 A1* | 12/2009 | Schaeffer | B23K 35/00 | 219/145.22 |
| 2010/0003535 A1* | 1/2010 | Hara | B23K 9/0253 | 428/586 |
| 2010/0116802 A1* | 5/2010 | Keegan | B23K 35/0261 | 219/136 |
| 2010/0258612 A1* | 10/2010 | Kolbeck | B23K 20/125 | 228/2.1 |
| 2010/0330388 A1* | 12/2010 | Hara | B23K 9/0282 | 428/586 |
| 2012/0291907 A1* | 11/2012 | Fujishiro | B23K 31/027 | 138/171 |
| 2013/0078031 A1* | 3/2013 | Nakamura | B23K 35/0255 | 403/272 |
| 2013/0270233 A1* | 10/2013 | Gu | B23K 26/28 | 219/121.64 |
| 2014/0138366 A1* | 5/2014 | Zhang | B23K 35/286 | 219/137 WM |
| 2015/0017052 A1* | 1/2015 | Matic | B23K 35/325 | 419/8 |

OTHER PUBLICATIONS

Wang et al., "'In-situ' weld-alloying/laser beam welding of SiCp/6061Al MMC", Materials Science and Engineering A, Nov. 30, 2000, pp. 1-6, vol. 293, Issues 1-2, Elsevier Science S.A.

Gu et al., "Laser Beam Welding of Nitride Steel Components", Physics Procedia, Apr. 15, 2011 (online publication date), pp. 40-45, vol. 12, Part A, Elsevier Ltd.

International Search Report dated Mar. 27, 2012 in corresponding International Application No. PCT/CA2011/001390.

* cited by examiner

METHOD FOR GAS METAL ARC WELDING (GMAW) OF NITRIDED STEEL COMPONENTS USING CORED WELDING WIRE

CROSS-REFERENCE TO RELATED APPLICATIONS

This U.S. Continuation-In-Part application claims the benefit of U.S. patent application Ser. No. 13/993,244, filed Jun. 11, 2013, which is a national stage entry of PCT/CA11/01390, filed Dec. 19, 2011, which claims priority from U.S. Provisional Patent application No. 61/424,327, filed Dec. 17, 2010, which are each incorporated herein by reference in their entirety. This U.S. Continuation-In-Part Application also claims the benefit of U.S. Provisional Patent Application No. 62/115,859, filed Feb. 13, 2015, which is incorporated herein by reference in its entirety.

BACKGROUND OF THE INVENTION

1. Field of the Invention

The invention relates generally to a method for welding of surface treated metal components, such as for example gas metal arc welding (GMAW) of nitrided steel components, and welded structures formed of surface treated metal components.

2. Related Art

Steel components used in automotive vehicle applications are oftentimes joined by a welding technique. Laser beam welding is one type of joining technique that offers a number of advantages, such as for instance low heat input, short cycle time and good cosmetic welds. The process is frequently used in high volume applications, such as for instance the welding together of powertrain components in the automotive industry. In this way, components that contain multiple grades or multiple types of material can be manufactured at relatively low production cost.

Gas metal arc welding is another method used to weld metal components, for example steel components used in automotive vehicle applications. This welding technique includes forming an arc between a consumable wire electrode and a joint between the two metal components to transfer material from the wire electrode to the joint. The heated wire material can be transferred by various different methods, for example globular, short-circuiting, spray, and pulsed spray. The material transferred from the wire electrode to the joint melts a portion of the two components along the joint and forms a weld. The weld includes a mixture of materials from the two components as well as the material from the consumable wire electrode. The GMAW technique is relatively fast and can be automated. Thus, it is oftentimes a preferred technique for welding components in the automotive industry.

It is also oftentimes desirable to weld components formed of nitrided steel. Nitriding is a type of heat treatment that diffuses nitrogen into the surface of the steel component. The nitriding of steel is becoming more common because it allows for the use of thinner components, which reduces weight. Nitriding is also desirable because it increases the tensile strength, yield strength, and hardness of the component. The nitriding process can include gas nitriding, salt bath nitriding, or plasma nitriding. However, when GMAW is used on a nitrided steel component, the resulting weld includes an undesirably high porosity caused by nitrogen bubbles coming from the nitrided steel. This high porosity can affect the quality and performance of the weld and thus should be avoided. One technique used to avoid the high porosity is to remove the nitrided layer from the surface of the steel component in the welding zone, and then mask the surrounding areas of the nitrided steel component, before the GMAW process. Thus, the weld is formed from a portion of the component which does not include the nitrided layer, and therefore the nitrogen bubbles leading to the undesirable porosity in the weld are avoided. The cost and time required to remove the nitrided layer and mask the surrounding areas, however, is not ideal.

SUMMARY OF THE INVENTION

One aspect of the invention provides a process for laser beam welding of nitride steel components. The method includes relatively arranging two steel components to form a joint that is to be welded, wherein at least one of the two steel components is a nitride steel component. The method then includes forming a weld along the joint so as to join together the two steel components. The forming step comprises advancing a laser beam irradiation position along the joint in a welding direction, the laser beam irradiating the two steel components at the irradiation position and forming within the joint a weld pool containing molten steel from the two steel components heated to a welding temperature; and advancing a filler wire along the joint in the welding direction, the filler wire having a core comprising a metallic composite that contains titanium, the filler wire preceding the laser beam irradiation position in the welding direction and being spaced away from the laser beam by a distance that is sufficiently small such that a tip portion of the filler wire is introduced directly into the weld pool in front of the laser beam along the welding direction. The melted material from the tip portion of the filler wire mixes into the weld pool, and the titanium that is present in the melted material combines with nitrogen from the nitride steel component and forms titanium nitride inside the weld pool at the welding temperature.

Another aspect of the invention provides a process for laser beam welding of nitrided steel components, comprising relatively arranging two steel components to form a joint that is to be welded, at least one of the two steel components being a nitride steel component; using a laser beam, irradiating the two steel components along the joint so as to heat material within each of the two steel components to a welding temperature and thereby form a weld pool in the joint; and introducing titanium into a leading edge of the weld pool, the leading edge of the weld pool being in front of the laser beam along a welding direction. The introduced titanium combines with nitrogen that is released into the weld pool from the nitride steel component to form titanium nitride within the weld pool at the welding temperature.

Another aspect of the invention provides a process for laser beam welding of surface treated steel components, comprising: relatively arranging two steel components to form a joint that is to be welded, at least one of the two steel components being a surface treated steel component; and forming a weld along the joint so as to join together the two steel components. The forming step includes advancing a laser beam irradiation position along the joint in a welding direction, the laser beam irradiating the two steel components at the irradiation position and forming within the joint a weld pool containing molten steel from the two steel components heated to a welding temperature; and advancing a filler wire along the joint in the welding direction. The filler wire has a core comprising a metallic composite including a constituent that is selected to form a compound with a species that is released into the weld pool from the surface treated steel component, and the filler wire precedes the laser beam irradiation position in the welding direction and is spaced away from the laser beam by a distance that is sufficiently small such that a tip portion of the filler wire is heated above a melting temperature thereof during the forming of the weld pool. The melted material from the tip portion of the filler wire mixes into the weld pool and the constituent that is present in the melted material combines with the species that is released from the surface treated steel component to form the compound inside the weld pool at the welding temperature.

Yet another aspect of the invention provides a process for laser beam welding of surface treated steel components, comprising: relatively arranging two steel components to form a joint that is to be welded, at least one of the two steel components being a surface treated steel component; using a laser beam, irradiating the two steel components along the joint so as to heat material within each of the two steel components to a welding temperature and thereby form a weld pool; and introducing a metallic constituent into a leading edge of the weld pool, the leading edge of the weld pool being in front of the laser beam along a welding direction. The introduced metallic constituent combines with a species that is released into the weld pool from the surface treated steel component to form a compound that is stable within the weld pool at the welding temperature.

The invention also provides a method for gas metal arc welding (GMAW) a component formed of nitrided steel to another component without removal of the nitrided layer or mask, and thus providing for reduced costs and improved efficiency.

The method includes disposing a first component formed of nitrided steel along a second component to present a joint therebetween; and forming an electric arc between a welding wire and the joint. The step of forming the electric arc between the welding wire and the joint includes transferring material of the welding wire to the joint and melting at least a portion of each component with the material of the welding wire to form a weld. The material of the welding wire is iron-based and includes aluminum and/or titanium. Preferably, the welding wire includes a core formed of the iron-based material with the aluminum and/or titanium, and the core is surrounded by a tube formed of an iron-based material. The nitrogen present in the melted nitrided steel combines with the aluminum and/or titanium of the melted welding wire in the welding pool and thus forms aluminum nitride (AlN) and/or titanium nitride (TiN), instead of the nitrogen bubbles which lead to the undesirably high porosity.

Another aspect of the invention provides a welded structure formed by gas metal arc welding, wherein the welding wire includes aluminum and titanium. The welded structure includes a first component formed of nitrided steel, and a second component welded to the first component. The weld formed between the two components includes aluminum nitride and titanium nitride, instead of the undesirably high porosity found in the prior structures.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF EXAMPLE EMBODIMENTS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
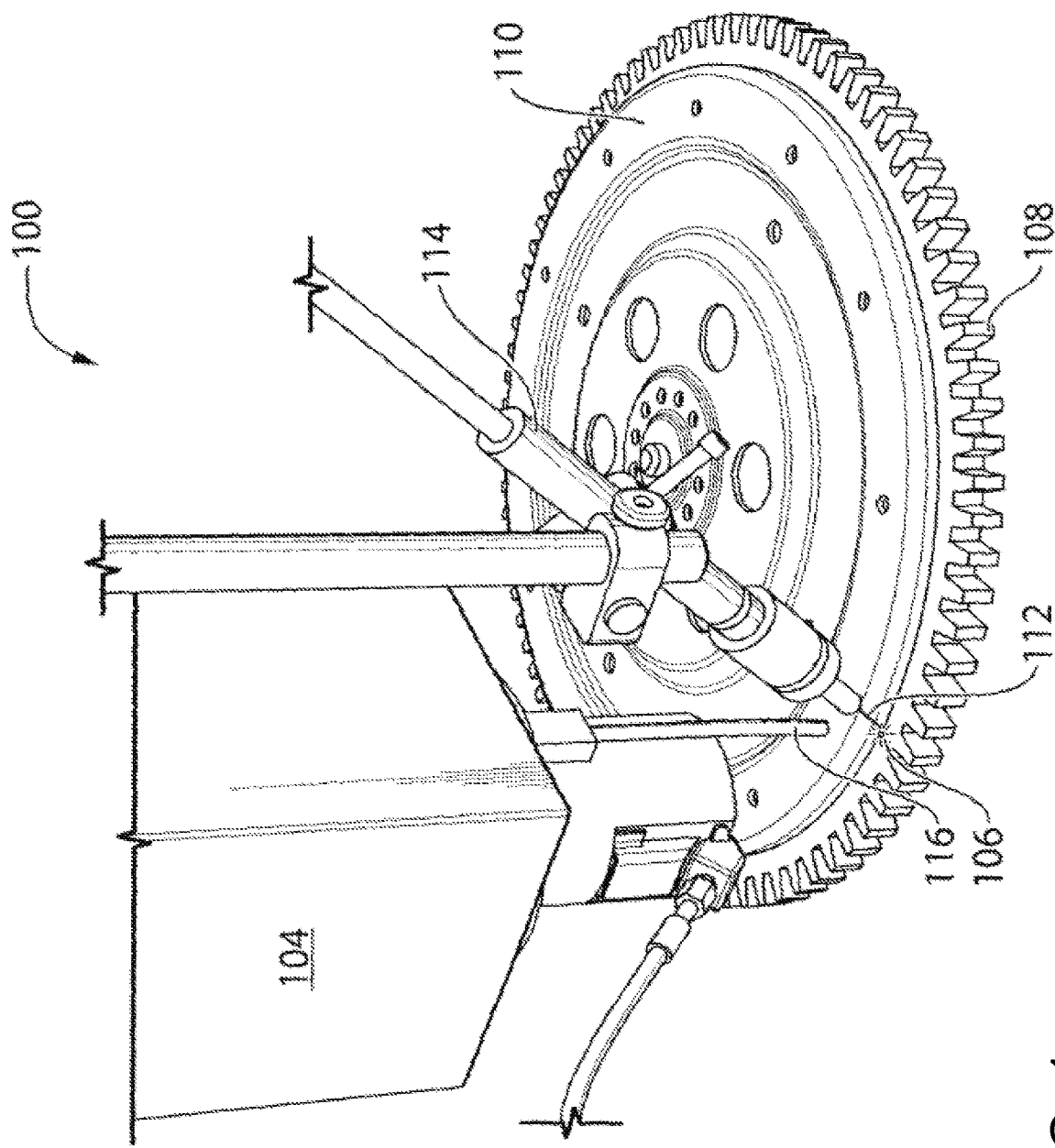
FIG. 1 is a simplified perspective view of a laser welding system, which is suitable for implementing a process according to an embodiment of the instant invention.

Referring to FIG. 1, shown is a simplified perspective view of a laser welding system, which is suitable for implementing a process according to an embodiment of the instant invention. In particular, the system of FIG. 1 is suitable for laser welding nitride steel components as well as other types of surface treated metal components. The system that is shown generally at 100 comprises a laser source (not shown), such as for instance a disk laser. By way of a specific and non-limiting example, the laser source is a Trumpf model TruDisk 4002 laser, having a maximum output power of 4 kW at a wavelength of 1030 nm. The laser beam is delivered using an optical fiber of core diameter of 600 μm (not shown), and is focused on the workpiece surface using a suitable laser welding head 104, such as for instance a Trumpf D70 laser welding head. In this example, both the collimating lens and the focusing lens of the welding head 104 have a focal length of 200 mm. Hence the size of the beam spot 106 at focus is 0.6 mm in diameter. Optionally, another suitable laser source and/or another suitable welding head is used in place of the specific examples that have been discussed above.

In the system 100 that is shown in FIG. 1, the welding head 104 is mounted on the end effecter of a not illustrated robot, such as for instance an ABB model IRB4400 robot. For instance, the robot is programmed to move the welding head 104 to perform the welding between a ring gear 108 and a thin disc of stamped steel 110 so as to form a flexplate. As is discussed above, the ring gear 108 is typically treated by carbonization to increase the hardness and wear-resistance of its teeth, while the stamped disc 110 is made of low carbon steel and is nitrided. In the instant example, the stamped disc 110 is gas nitrided with a tumble polish, the diffusion thickness of the nitrogen is 0.45 mm at a minimum, and the compound layer thickness is ≥0.015 mm. The surface of the stamped disc 110 with the nitride layer is one of the butting surfaces in the joint that is being laser welded.

Referring still to FIG. 1, a metal-cored filler wire 112 is fed using a wire-feeding device 114 such that a tip portion of the filler wire 112, which is also commonly referred to as a fillet wire, is positioned proximate to the beam spot 106. The wire-feeding device 114 is mounted on the welding head 104 so that the position of the wire-feeding device 114 relative to the welding head 104 is fixed. Shielding gas is provided via a shielding gas nozzle 116 in a known fashion, in order to protect the weld area from oxidation.

Figure 2:
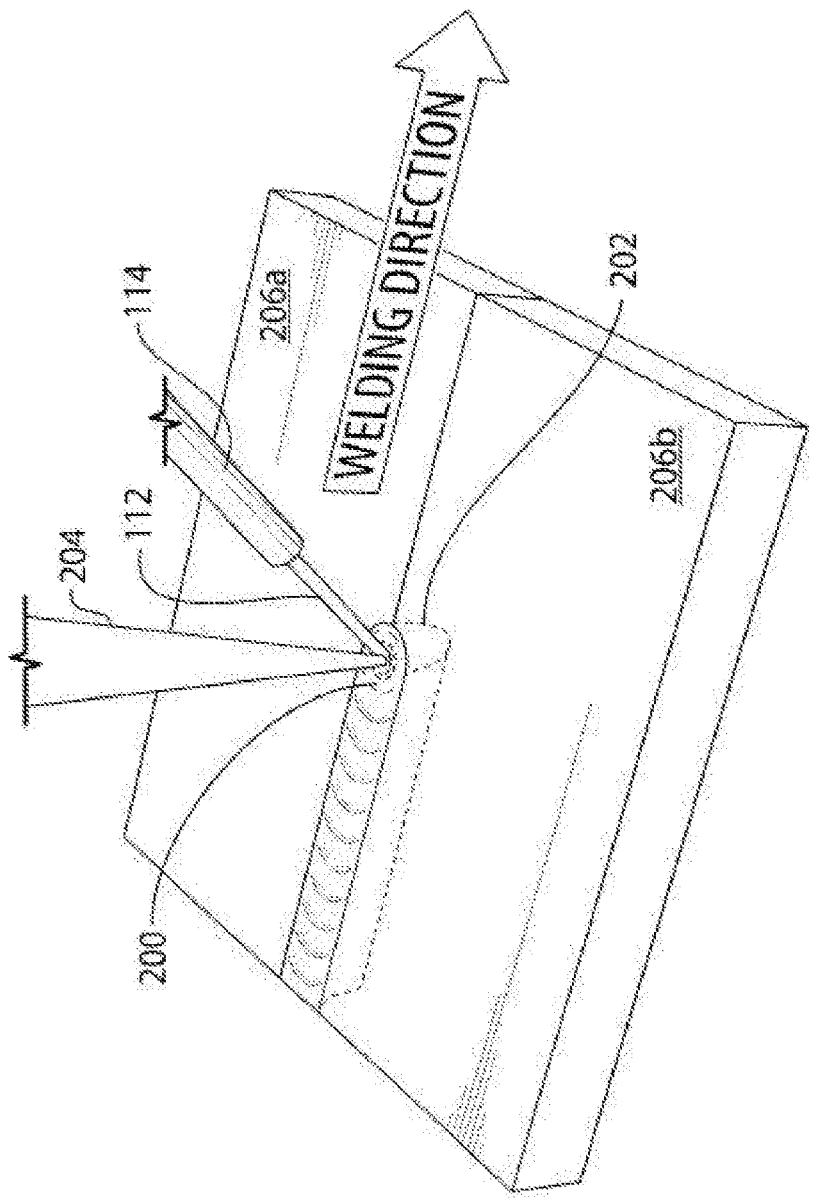
FIG. 2 is a diagrammatic isometric view showing a laser welding process according to an embodiment of the instant invention.

Referring now to FIG. 2, shown is a diagrammatic isometric view of a laser welding process according to an embodiment of the instant invention. During the laser welding process, the filler wire 112 is fed into the weld pool 200 at a location that is in front of the laser beam 204 in the welding direction, such that melted filler wire material 202 mixes efficiently with the melt material in the joint between the components that are being welded. The heat that is produced when the laser beam 204 irradiates the surface of the work pieces 206a and 206b and forms the weld pool 200 is sufficient to cause the filler wire 116 to melt, such that the tip portion of the filler wire 112 is deposited directly into the leading edge of the weld pool 200. By way of a specific and non-limiting example, the filler wire has a stainless steel sheath and a metal core containing titanium. A suitable, commercially available filler wire (from Select Arc Inc.) has a metal core containing by weight %: C 0.03, Mn 0.60, P 0.01, S 0.01, Si 0.69, Cr 11.90, Ti 1.00.

Without wishing to be held to any particular theory, the following is thought to apply. The materials of the two components that are being welded together, in this example the ring gear 108 and stamped disc 110, melt under the influence of the laser beam 204 as the laser beam 204 moves along the weld direction, thereby forming a moving weld pool 200. It is believed that the nitride layer of the stamped disc 110 decomposes at the elevated temperature within the weld pool 200, releasing nitrogen that subsequently reacts with the titanium that is introduced from the metal-cored filler wire 112, thereby forming titanium nitride. Titanium nitride has a very high melting point (2950° C.) and is chemically stable under the conditions that exist within the weld pool 200. Thus, as the laser beam 204 advances along the welding direction the nitrogen remains bound to the titanium and does not form bubbles as the weld pool 200 cools and eventually solidifies.

Figure 4:
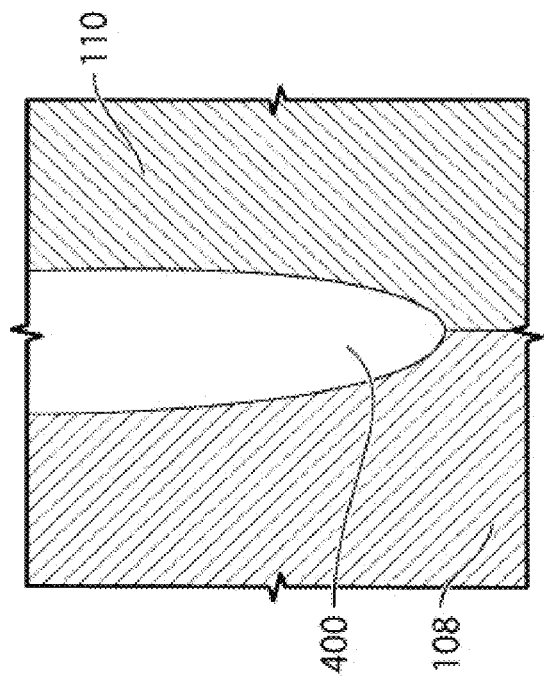
FIG. 4 is a diagrammatic view illustrating a cross-sectional profile of a laser weld between nitride steel components, formed using a process according to an embodiment of the instant invention.
Figure 3:
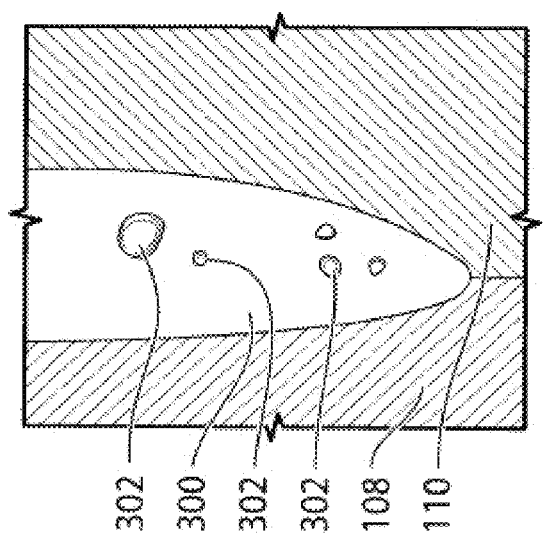
FIG. 3 is a diagrammatic view illustrating a cross-sectional profile of a laser weld between nitride steel components, formed using a prior art process.

FIGS. 3 and 4 compare the laser welds that are formed between nitride steel components using the prior art process (FIG. 3) and the process according to an embodiment of the instant invention (FIG. 4). As is shown in FIG. 3, the weld 300 that is formed between the ring gear 108 and the stamped disc 110 contains large voids or pores 302, which correspond to occluded nitrogen gas bubbles that became trapped during the rapid cooling of the weld pool 200. In particular, these large voids or pores 302 are present throughout the laser weld that is formed using the prior art process without filler wire. Although the weld 300 is cosmetically acceptable, the presence of the voids or pores 302 makes the weld unacceptable structurally. On the other hand, the weld 400 that is illustrated in FIG. 4 exhibits reduced porosity compared to the weld that is illustrated in FIG. 3. In fact, the main body of the weld 400 does not contain any large voids or pores. Only near the root of the weld 400 are small voids discernable, which are believed to occur due to the inability of the material from the filler wire 112 to mix with the molten material from the workpieces at the bottom of the weld 400. That being said, the presence of small voids near the root of the weld 400 does not adversely affect the strength of the weld 400. For instance, in a destructive test of a finished flexplate having 8-segment welds distributed equally along the joining interface, the part was able to hold more than 37,000 lb force before breaking the welds. To put this in perspective, the rated specification for the push test of the part is 10,000 lb.

The alloying constituents of the metal-cored filler wire 112 can be formulated for joining together steel components with specific coatings. In this way, the titanium in the metal-cored filler wire 112 can be used for joining together steel components with a nitride coating as has been discussed above by way of a specific and non-limiting example. Optionally, the titanium is replaced by aluminum in the metal-cored filler wire 112 in order to solve the nitrogen issue associated with laser welding, since aluminum nitride (AlN) also has a high decomposition temperature and melting point and is a stable compound in the weld pool. Further optionally, zinc may be provided in the metal-cored filler wire for use in laser beam welding of aluminum-coated steel, such as for instance Usibor® steel. The aluminum has a low melting point and it has a rapid interaction with liquid Zn. In the weld pool, the aluminum and zinc form a liquid compound that has a very high vaporizing temperature (about 2450° C.), thereby preventing or reducing the formation of brittle compounds of aluminum and iron. Of course, other variations may also be envisaged.

Another aspect of the invention provides an efficient and cost effective method for manufacturing a welded structure 20, wherein at least one component 22, 24 of the structure 20 is formed of nitrided steel, by gas metal arc welding (GMAW). The method provides a strong and reliable weld 26, without having to remove a nitrided layer or mask portions of the nitrided steel component before the welding process. The improved weld 26 is achieved by a welding wire 28 which includes aluminum and/or titanium. Preferably, the welding wire 28 includes a core 30 formed of the iron-based material with aluminum and/or titanium, and the core 30 is surrounded by a tube 32 formed of an iron-based material. During the welding process, the melted nitrogen from the nitrided steel mixes with the aluminum and/or titanium of the melted welding wire 28 to form aluminum nitride (AlN) and/or titanium nitride (TiN) in the weld 26, instead of nitrogen bubbles which lead to the undesirably high porosity.

Figure 5:
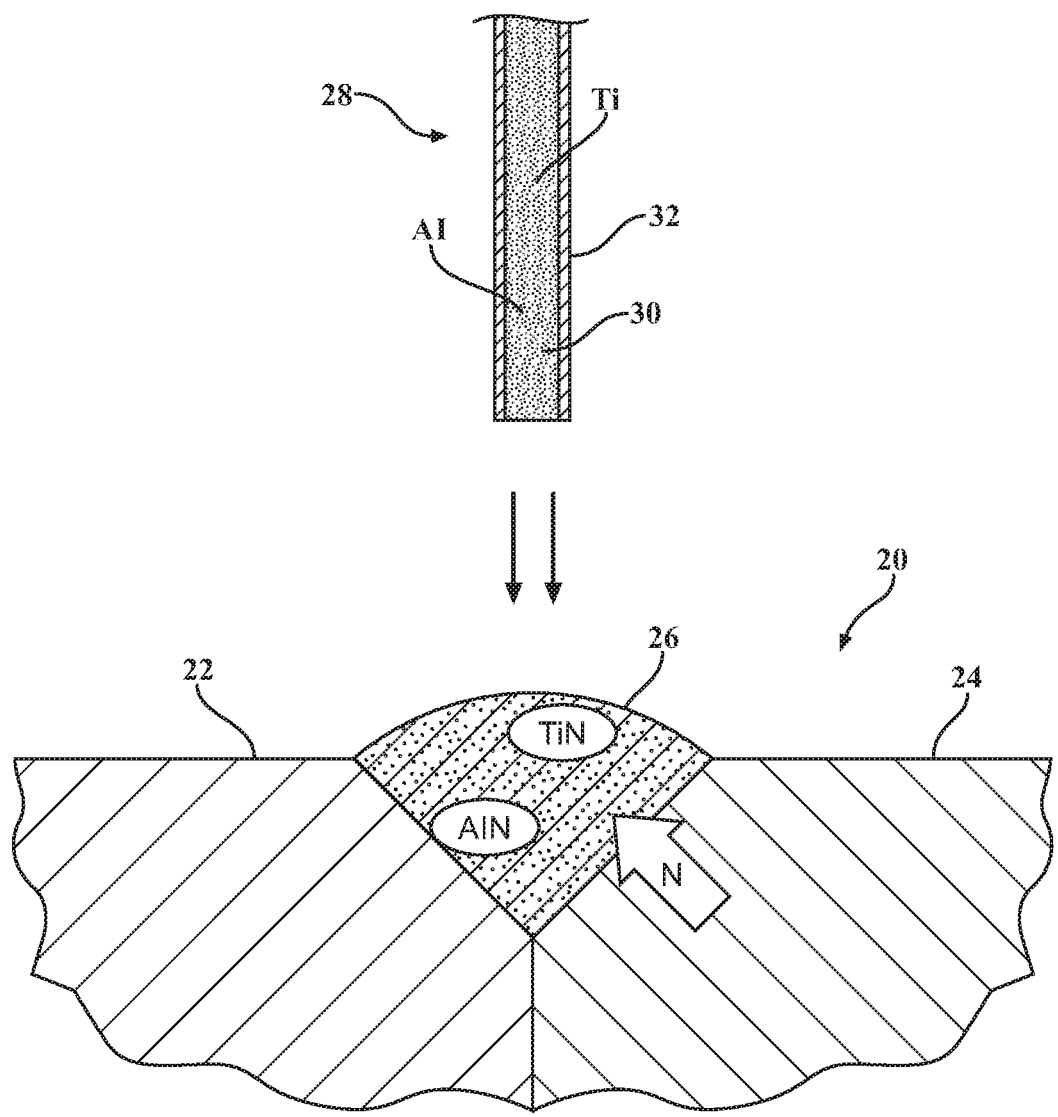
FIG. 5 is a side cross-sectional view of a welded structure including a first component formed of nitrided steel and a second component formed of medium carbon steel, and a welding wire used to form the weld according to an exemplary embodiment of the invention.

The method begins by providing the components 22, 24 to be welded. The method typically includes welding a first component 22 to a second component 24, as shown in FIG. 5, but the method could alternatively include welding more than two components together. In the exemplary embodiment, the first component 22 is formed of nitrided steel, specifically a high strength low alloy (HSLA) steel referred to as 420XF having a surface hardness of 400 HV1. However, various other nitrided steel compositions could be used. The second component 24 of the exemplary embodiment is also formed of steel, specifically medium carbon steel referred to as 1045 or 1050 induction hardened steel. However, various other steel compositions or even different metal compositions could be used to form the second component 24. For example, the second component 24 could also be formed of nitrided steel, or it could be formed from another metal different from the first component 22.

The first and second components 22, 24 can have various different geometries, depending on the intended application of the welded structure 20. In the exemplary embodiment, the first and second components 22, 24 are designed to provide a two-piece flexplate for use in an automotive vehicle. The first component 22 formed of nitrided steel is used as the can of the flexplate, and the second component 24 formed of medium carbon steel is used as the ring gear of the flexplate. The ring gear includes a plurality of teeth, and the steel of the teeth is typically not induction hardened, like the remaining portion of the ring gear. However, the first and second components 22, 24 could be designed for any other type of automotive application, such as a powertrain application, or a non-automotive. In addition, more than two components could be welded according to the method of the present invention. Prior to welding the components 22, 24 together, no preparation of the components 22, 24 is required, in contrast to other methods which required removing the nitrided layer and/or masking of the nitrided steel.

The method then includes welding the first component 22 to the second component 24 by gas metal arc welding (GMAW) with the welding wire 28. At least a portion of the welding wire 28 includes at least one of aluminum and titanium, but preferably both aluminum and titanium, to prevent the nitrogen bubbles and reduce porosity in the finished weld 26. In the exemplary embodiment shown in FIG. 5, the welding wire 28 includes the core 30 surrounded by the tube 32. The material of the core 30 is formed of mild steel and includes both aluminum and titanium. The aluminum is typically present in an amount of 0.7 to 3.0 weight percent (wt. %), and the titanium is typically present in an amount of 0.7 to 1.5 wt. % based on the total weight of the mild steel of the core 30. In the exemplary embodiment, the mild steel includes 0.8 wt. % aluminum and 0.7 wt. % titanium. The mild steel also includes about 0.1 to 0.3 wt. % carbon, based on the total weight of the mild steel, and may contain various other alloying elements, typically in trace amounts. For example, in addition to the aluminum and titanium, the mild steel of the core 30 could include 0.18 wt. % carbon, 0.80 wt. % manganese, 0.01 wt. % phosphorous, 0.01 wt. % sulfur, 0.4 wt. % silicon, possibly trace amounts of impurities, and a balance of iron. However, various other compositions can be used to form the core 30 of the welding wire 28, as long as the welding wire 28 includes aluminum and/or titanium.

The tube 32 of the exemplary welding wire 28 is formed entirely of low carbon steel, which also typically includes about 0.1 to 0.3 wt. % carbon, based on the total weight of the low carbon steel, and may contain various other alloying elements. For example, the low carbon steel of the tube 32 could include 0.18 wt. % carbon, 0.80 wt. % manganese, 0.01 wt. % phosphorous, 0.01 wt. % sulfur, 0.4 wt. % silicon, possibly trace amounts of impurities, and a balance of iron. However, various other compositions can be used to form the tube 32 of the welding wire 28.

The core 30 and tube 32 design of the welding wire 28 is preferred over other designs for numerous reasons, one of them being increased efficiency. For example, the core 30 and tube 32 reduces the amount of gassing, spatter, and slag during the welding process. Thus, the amount of time and costs required to mask surrounding portions of the components 22, 24, remove the spatter and slag, and/or clean the components 22, 24 after the welding process is reduced. Due to less gassing, splatter, and slag, the core 30 and tube 32 also provides a higher deposition rate and greater welding speed. It has been found that with the core 30 and tube 32 design, at least 97% of the welding wire 28 is transferred to the components 22, 24 to form the weld 26. Due to the higher deposition rate, there is less weight and a reduced amount of the welding wire 28 is needed to form the weld 26. In other words, there is less consumption of the welding wire 28. In addition, the speed of the welding process can increase by about 20% when the core 30 and tube 32 are used.

The gas metal arc welding process is typically conducted in an enclosed chamber, and first includes disposing the two separate components 22, 24 in contact with one another to form a joint therebetween. The method then includes disposing the welding wire 28 in a welding gun and pointing the welding gun toward the joint between the two components 22, 24. The welding process then includes applying a voltage and current to the welding wire 28 so that an electric arc forms between the welding wire 28 and the components 22, 24. The welding wire 28 is fed continuously through the welding gun and thus functions as a consumable electrode. A shielding gas is also fed through the welding gun to reduce contamination.

When the electric arc is formed between the welding wire 28 and the components 22, 24, material at the tip of the welding wire 28 melts and transfers to the joint between the two components 22, 24. Transfer of the welding wire 28 to the joint can be accomplished by various methods known in the art, for example globular, short-circuiting, spray, and pulsed-spray. The melted material from the welding wire 28 is very hot, and thus melts a portion of the first component 22 and a portion of the second component 24 disposed along the joint. The melted material of the welding wire 28, which includes the aluminum and titanium, mixes with the melted portions of the components 22, 24 to form a weld pool, and the weld pool solidifies to form the weld 26.

Figure 6:
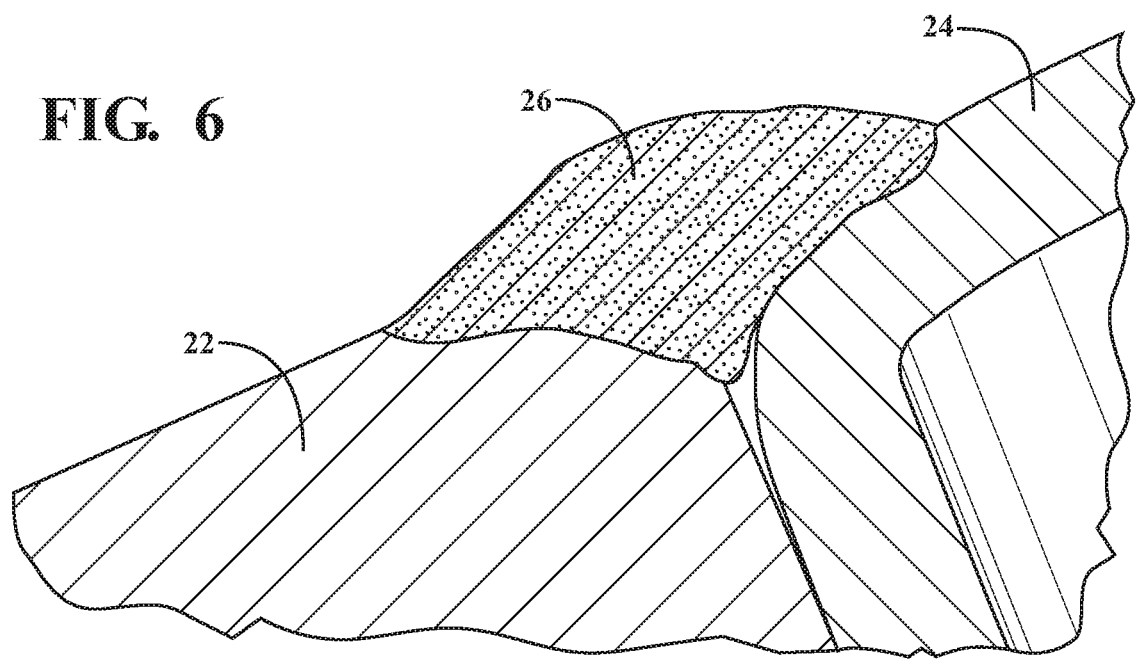
FIG. 6 shows the low porosity of the weld formed according to an exemplary embodiment of the invention.

As discussed above, the aluminum and/or titanium from the welding wire 28 mixes with the nitrogen from the nitrided steel in the weld pool to form aluminum nitride and/or titanium nitride, rather than nitrogen bubbles which cause undesirable porosity in the weld 26. FIG. 6 shows the low porosity of the weld 26 formed by the method of the subject invention. The amount of aluminum nitride and titanium nitride formed in the weld 26 depends at least in part on the conversion rate of aluminum and titanium. The conversion rate also depends on several factors, including the amount of aluminum and titanium in the welding wire 28, and the amount of nitrogen released from the first component 22 during the welding process.

The weld 26 of the finished structure 20 includes a mixture of the nitrided steel of the first component 22, the low carbon steel of the second component 24, and the mild steel of the welding wire 28. Only a small portion of the first and second components 22, 24 along the joint melt to form the weld 26, and the rest of each component 22, 24 remains solid. In the exemplary embodiment, the material of the weld 26 in the finished structure 20 includes about 0.3 to 2.9 wt. % of the solid aluminum nitride and about 0.3 to 2.9 wt. % of the solid titanium nitride, based on the total weight of the material of the weld 26. However, it is noted that this composition is only an example, and the weld 26 of the finished structure 20 formed according to the method of the present invention could include other amounts of aluminum nitride and/or titanium nitride. The presence of the aluminum nitride and/or titanium nitride in the weld 26 of the finished structure 20 can be detected by energy dispersive X-ray spectroscopy (EDS) and X-ray diffraction (XRD).

The geometry of the weld 26 can also vary depending on the geometry of the intended application of the finished structure 20. However, no change in the geometry of the joint between the components 22, 24 is required to form the weld 26. In the exemplary embodiment shown in FIG. 6, one side of the weld 26 has a length of about 4.15 mm, and the other side has a length of about 3.47 mm.

Figure 7:
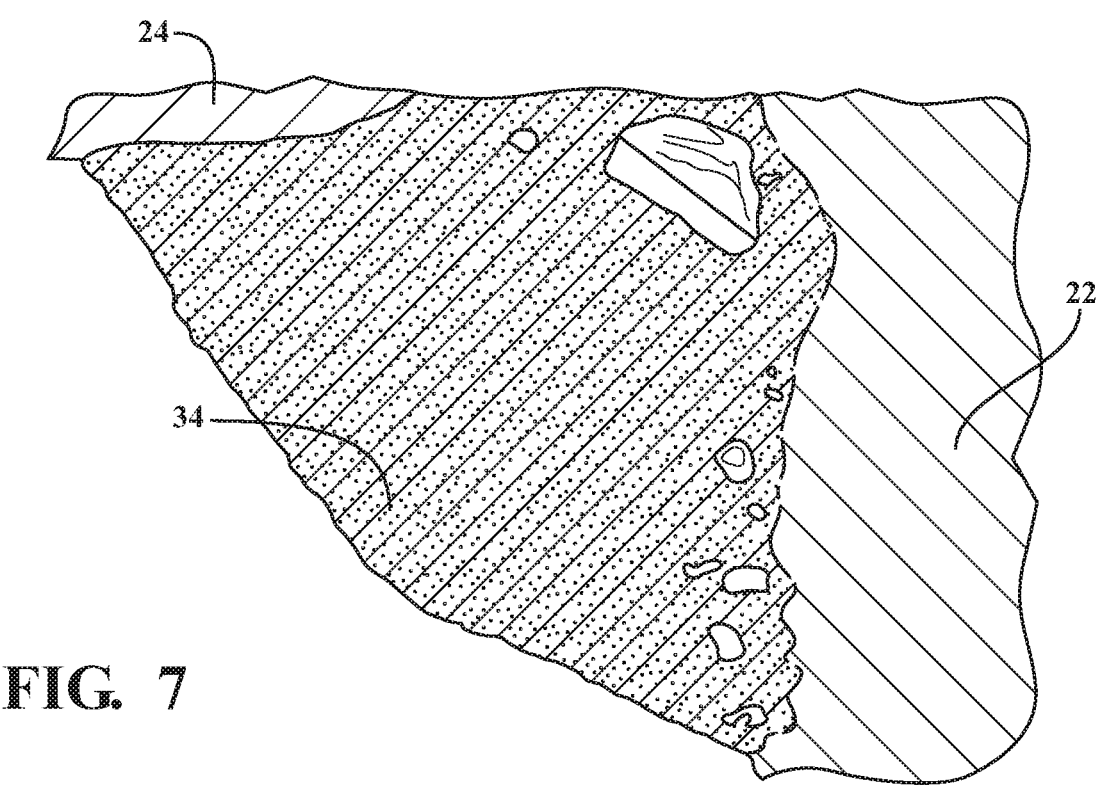
FIG. 7 shows the higher porosity of a weld formed according to a comparative method.

An experiment was conducted to compare the porosity in the weld 26 formed with the exemplary welding wire 28 and a weld formed with a comparative welding wire. The exemplary welding wire 28 included the core 30 formed of mild steel with aluminum in an amount of 0.7 to 3.0 wt. % and titanium in an amount of 0.7 to 1.5 wt. %, and the tube 32 formed of low carbon steel, as described above. The comparative welding wire did not include a tube and core, with aluminum and titanium in the core. Rather, the comparative welding wire included a low carbon steel material. The experiment included gas metal arc welding the first component 22 formed of nitrided steel to the second component 24 formed of non-nitrided steel with the exemplary welding wire 28 and also with the comparative welding wire. FIG. 6 shows the weld 26 produced using the exemplary welding wire 28, and FIG. 7 shows the weld 34 produced using the comparative welding wire 28. These two Figures clearly show the reduced porosity achieved with the exemplary welding wire 28. The weld 34 formed with the comparative welding wire includes a plurality of pores, and one pore shown has a length of 1.29 mm. The weld 26 formed from the exemplary welding wire 28 includes little to no porosity, and is free of pores having a length of 1.29 mm or greater.

Obviously, many modifications and variations of the present invention are possible in light of the above teachings and may be practiced otherwise than as specifically described while within the scope of the invention.

What is claimed is:

1. A method for welding components, comprising the steps of:

disposing a first component formed of nitrided steel along a second component formed of non-nitrided steel to present a joint therebetween;

performing a gas metal arc welding procedure on the first component and the second component along the joint without removing a nitrided layer or masking portions of the first component before performing the gas metal arc welding procedure;

forming an electric arc between a welding wire and the joint during the gas metal arc welding procedure;

the step of forming the electric arc between the welding wire and the joint including transferring material of the welding wire to the joint and melting at least a portion of each component with the material of the welding wire to form a weld along the joint, wherein the material of the welding wire is iron-based and includes aluminum and titanium, wherein the welding wire includes a core surrounded by a tube, the material of the core includes the iron-based material having 0.7 to 3.0 wt. % aluminum and/or 0.7 to 1.5 wt. % titanium, and the material of the tube is formed of a different material being that is an iron-based material;

wherein the material of the core is a mild steel material wherein the weld formed along the joint includes a mixture of nitrided steel from the first component, non-nitrided steel of the second component, and mild steel of the weld wire, wherein the weld contains aluminum nitride and titanium nitride.

2. The method of claim 1, wherein the iron-based material of the core includes carbon in an amount of 0.1 to 0.3 wt. %, based on the total weight of iron-based material.

3. The method of claim 1, wherein the iron-based material of the tube includes carbon in an amount of 0.1 to 0.3 wt. %, based on the total weight of the iron-based material, and the iron-based material of the tube does not include titanium or aluminum.

* * * * *